(12) United States Patent
Wang et al.

(10) Patent No.: US 12,444,038 B2
(45) Date of Patent: Oct. 14, 2025

(54) INDUSTRIAL DEFECT RECOGNITION METHOD AND SYSTEM, COMPUTING DEVICE, AND STORAGE MEDIUM

(71) Applicant: Huawei Cloud Computing Technologies Co., Ltd., Guizhou (CN)

(72) Inventors: Xiudong Wang, Beijing (CN); Xin Jin, Beijing (CN); Dandan Tu, Shenzhen (CN)

(73) Assignee: HUAWEI CLOUD COMPUTING TECHNOLOGIES CO., LTD., Guizhou (CN)

(*) Notice: Subject to any disclaimer, the term of this patent is extended or adjusted under 35 U.S.C. 154(b) by 253 days.

(21) Appl. No.: 18/316,757

(22) Filed: May 12, 2023

(65) Prior Publication Data

US 2023/0281784 A1    Sep. 7, 2023

Related U.S. Application Data

(63) Continuation of application No. PCT/CN2021/124254, filed on Oct. 16, 2021.

(30) Foreign Application Priority Data

Nov. 13, 2020   (CN) .......................... 202011268302.9

(51) Int. Cl.
  *G06T 7/00*    (2017.01)
  *G06V 10/22*   (2022.01)
  *G06V 10/82*   (2022.01)

(52) U.S. Cl.
  CPC ............ *G06T 7/0004* (2013.01); *G06V 10/22* (2022.01); *G06V 10/82* (2022.01);
  (Continued)

(58) Field of Classification Search
  CPC ......... G06T 7/0004; G06T 2207/20081; G06T 2207/20084; G06T 2207/30108; G06V 10/82; G06V 10/22
  (Continued)

(56) References Cited

FOREIGN PATENT DOCUMENTS

CN    109034204 A    12/2018
CN    109087294 A    12/2018
(Continued)

OTHER PUBLICATIONS

Marino, Sofia, Pierre Beauseroy, and André Smolarz. "Weakly-supervised learning approach for potato defects segmentation." Engineering Applications of Artificial Intelligence 85 (2019): 337-346. (Year: 2019).*
(Continued)

*Primary Examiner* — Amandeep Saini
(74) *Attorney, Agent, or Firm* — Conley Rose, P.C.

(57) ABSTRACT

A target region is first extracted from a to-be-recognized image, and then a defect coarse-selection region including an industrial defect is obtained from the target region. Through two times of region extraction, a proportion of a size of the industrial defect to a size of a background is increased, so that a probability of detecting a small-sized industrial defect can be increased. After the defect coarse-selection region including the industrial defect is detected, localization and size estimation are further performed on the industrial defect in the defect coarse-selection region.

20 Claims, 6 Drawing Sheets

(52) U.S. Cl.
CPC .............. *G06T 2207/20081* (2013.01); *G06T 2207/20084* (2013.01); *G06T 2207/30108* (2013.01)

(58) Field of Classification Search
USPC ........................................................ 382/141
See application file for complete search history.

(56) References Cited

FOREIGN PATENT DOCUMENTS

| | | |
|---|---|---|
| CN | 105891215 B | 1/2019 |
| CN | 111007073 A | 4/2020 |
| JP | H10142165 A | 5/1998 |

OTHER PUBLICATIONS

Jiabin Zhang et al, "Quality Inspection Based on Quadrangular Object Detection for Deep Aperture Component," IEEE Transactions on Systems, Man, and Cybernetics: Systems, vol. 51, No. 10, IEEE, Piscataway, NJ, USA, Oct. 2021, 11 pages.

Sofia Marino et al, "Weakly-supervised learning approach for potato defects segmentation," Engineering Applications of Artificial Intelligence, Pineridge Press, Swansea, GB, vol. 85, Jul. 4, 2019, 10 pages.

Xinghui Dong et al, Small Defect Detection Using Convolutional Neural Network Features and Random Forests, ECCV, Sep. 8, 2018, total 15 pages.

\* cited by examiner

INDUSTRIAL DEFECT RECOGNITION METHOD AND SYSTEM, COMPUTING DEVICE, AND STORAGE MEDIUM

CROSS-REFERENCE TO RELATED APPLICATIONS

This is a continuation of International Patent Application No. PCT/CN2021/124254 filed on Oct. 16, 2021, which claims priority to Chinese Patent Application No. 202011268302.9 filed on Nov. 13, 2020. The disclosures of the aforementioned applications are hereby incorporated by reference in their entireties.

TECHNICAL FIELD

Embodiments of this disclosure relate to the field of artificial intelligence (AI) technologies, and in particular, to an industrial defect recognition method and system, and a storage medium.

BACKGROUND

In the industrial field, industrial defects such as weld seam defects may occur in a process of producing, manufacturing, and maintaining industrial products. To ensure normal use of the industrial products, it is necessary to perform industrial defect detection on the industrial products. Currently, performing detection based on an image of an industrial product is one of important means of industrial defect detection. In addition, with wide application of neural network models in the image recognition field in recent years, some methods for recognizing an industrial defect in an image based on a neural network model have emerged. However, the current method for recognizing an industrial defect based on a neural network model is usually applicable only to recognition of a large-sized industrial defect, and is hardly applicable to recognition of a small-sized industrial defect. In addition, a recognition result usually includes only recognition of an industrial defect type, meaning a single recognition dimension.

SUMMARY

Embodiments of this disclosure provide an industrial defect recognition method and system, a computing device, and a storage medium, to increase a probability of detecting a small-sized industrial defect, improve precision of defect localization and size estimation, and enrich recognition dimensions of the industrial defect. Technical solutions are as follows.

According to a first aspect, an industrial defect recognition method is provided. The method includes: obtaining a to-be-recognized image, where the to-be-recognized image is an image that reflects an industrial product; extracting at least one target region from the to-be-recognized image based on a target region detection model, where the at least one target region is a region in which an industrial defect may exist; obtaining, based on the at least one target region and a defect detection model, a defect coarse-selection region in a target region that is in the at least one target region and that includes an industrial defect, and a type of the industrial defect included in the defect coarse-selection region; and determining a size and a location of the industrial defect included in the defect coarse-selection region.

In embodiments of this disclosure, the target region is first extracted from the to-be-recognized image, and then the defect coarse-selection region including the industrial defect is obtained from the target region. Through two times of region extraction, a proportion of a size of the industrial defect to a size of a background is increased, so that a probability of detecting a small-sized industrial defect can be increased. After the defect coarse-selection region including the industrial defect is detected, localization and size estimation are further performed on the industrial defect in the defect coarse-selection region, so that precision of the defect localization and size estimation can be effectively improved. In addition, in this embodiment of this disclosure, not only the defect type is recognized, but also localization and size estimation can be performed on the industrial defect, enriching recognition dimensions of the industrial defect.

Optionally, an implementation process of the obtaining, based on the at least one target region and a defect detection model, a defect coarse-selection region in a target region that is in the at least one target region and that includes an industrial defect, and a type of the industrial defect included in the defect coarse-selection region is: using the at least one target region as an input of the defect detection model, and performing inference based on the defect detection model, to obtain a location, in the target region, of the defect coarse-selection region in the target region that is in the at least one target region and that includes the industrial defect, and the defect type of the industrial defect included in the defect coarse-selection region, where the defect detection model is an AI model trained by using a defect training sample; and extracting the defect coarse-selection region from the target region based on the location of the defect coarse-selection region in the target region.

The at least one target region is a region in which an industrial defect may occur. In this way, for any target region, the target region may include or may not include an industrial defect. Based on this, after the target region is extracted, the target region may be further detected based on the defect detection model, to determine whether the target region includes an industrial defect. If the target region includes an industrial defect, the defect detection model can output a defect coarse-selection region including the industrial defect and a type of the industrial defect.

In this embodiment of this disclosure, the target region extracted based on the target region detection model is a region that is of a large range and in which an industrial defect may occur, and the defect coarse-selection region obtained based on the defect detection model is a region that is extracted by narrowing down the range based on the target region, that is smaller than the target region, and that includes an industrial defect. In this way, a proportion of the industrial defect in the target region is greater than a proportion of the industrial defect in the to-be-recognized image, and a proportion of the industrial defect in the defect coarse-selection region is greater than the proportion of the industrial defect in the target region. In other words, a proportion of the industrial defect to the background is gradually increased by extracting the target region from the to-be-recognized image and then extracting the defect coarse-selection region from the target region. In this way, the probability of detecting a small-sized industrial defect can be increased.

Optionally, an implementation process of the determining a size and a location of the industrial defect included in the defect coarse-selection region may be: determining the size of the industrial defect included in the defect coarse-selection region and the location of the industrial defect in the defect coarse-selection region based on a grayscale distribution in the defect coarse-selection region; and determining, based on the location of the defect coarse-selection region in the target region, a location of the target region in the to-be-recognized image, and the location, in the defect coarse-selection region, of the industrial defect included in the defect coarse-selection region, a location, in the to-be-recognized image, of the industrial defect included in the defect coarse-selection region.

In this embodiment of this disclosure, after the defect coarse-selection region including the industrial defect is detected, the localization and size estimation are further performed on the industrial defect in the defect coarse-selection region based on the grayscale distribution in the defect coarse-selection region, so that the precision of the defect localization and size estimation can be effectively improved.

Optionally, after the localization and size estimation are performed on the industrial defect in the defect coarse-selection region, the method further includes: generating a detection report, where the detection report includes the defect type, the size, and the location of the industrial defect detected in the to-be-recognized image; and providing the detection report for a user.

Optionally, the industrial defect is a weld seam defect, and the target region is a region in which a weld seam is located.

Optionally, the method further includes: obtaining a plurality of industrial training samples, where each industrial training sample corresponds to target region annotation information, and the target region annotation information includes location information of a multi-degree-of-freedom quadrilateral annotated in the corresponding industrial training sample and annotation category information indicating that the corresponding multi-degree-of-freedom quadrilateral is a target region; and training a target region detection network based on the plurality of industrial training samples and the target region annotation information of each industrial training sample, to obtain the target region detection model.

In this embodiment of this disclosure, the target region that may include an industrial defect in the industrial training sample is annotated by using the multi-degree-of-freedom quadrilateral, and the target region detection network is trained based on the industrial training sample, to obtain the target region detection model. In this way, the target region detection model can more accurately detect various target regions that may include a defect and that are distributed in different directions and forms in the image.

Optionally, an implementation process of the training a target region detection network based on the plurality of industrial training samples and the target region annotation information of each industrial training sample may be: determining a first bounding rectangle and a second bounding rectangle based on target region annotation information of a first industrial training sample, where the first bounding rectangle is a minimum rotating bounding rectangle of a multi-degree-of-freedom quadrilateral annotated in the first industrial training sample, and the second bounding rectangle is a horizontal bounding rectangle of the first bounding rectangle; determining a predicted value of the multi-degree-of-freedom quadrilateral in the first industrial training sample, a predicted value of the first bounding rectangle, a predicted value of the second bounding rectangle, and prediction category information based on the target region detection network; calculating a loss function value based on the target region annotation information of the first industrial training sample, the first bounding rectangle, the second bounding rectangle, the predicted value of the multi-degree-of-freedom quadrilateral in the first industrial training sample, the predicted value of the first bounding rectangle, the predicted value of the second bounding rectangle, and the prediction category information; and performing parameter update on the target region detection network based on the loss function value.

Optionally, the method further includes: obtaining a plurality of defect training samples; extracting a plurality of target regions from the plurality of defect training samples based on the target region detection model; obtaining defect annotation information of a target region that is in the plurality of target regions and that includes an industrial defect, where the defect annotation information indicates a defect type and a location of the industrial defect in the corresponding target region; and training a defect detection network based on the target region including the industrial defect and the defect annotation information of the corresponding target region, to obtain the defect detection model.

In this embodiment of this disclosure, the target region detection model is first obtained through training, and then coarse localization is performed on the industrial defect included in the defect training sample based on the target region detection model, to extract the target region. Further, the defect detection network is trained based on the fine location and the defect type of the defect annotated in the target region, to obtain the defect detection model. In this way, when the target region extracted from the to-be-recognized image is subsequently detected based on the defect detection model, more accurate localization of the industrial defect in the target region can be obtained, and the specific defect type of the industrial defect can be output. This not only improves localization accuracy, but also enriches recognition dimensions of the defect.

Optionally, the target region detection model uses a multi-degree-of-freedom quadrilateral as a detection box, and an angle between each edge of the multi-degree-of-freedom quadrilateral and each edge of the to-be-recognized image is of any degree from 0 degrees to 180 degrees.

In this embodiment of this disclosure, when the target region is extracted, a neural network detection model that uses the multi-degree-of-freedom quadrilateral as a detection box is used, and is applicable to different types of target regions. The target region detection model has good universality.

According to a second aspect, an industrial defect recognition system is provided. The industrial defect recognition system has a function of implementing the industrial defect recognition method in the first aspect. The industrial defect recognition system includes at least one module, and the at least one module is configured to implement the industrial defect recognition method in the first aspect.

According to a third aspect, a computing device is provided. A structure of the computing device includes a processor and a memory. The memory is configured to: store a program used to support the computing device in performing the industrial defect recognition method in the first aspect, and store related data used to implement the industrial defect recognition method in the first aspect. The processor is configured to execute the program stored in the memory. The computing device may further include a communication bus, and the communication bus is configured to establish a connection between the processor and the memory.

According to a fourth aspect, a computer-readable storage medium is provided. The computer-readable storage medium stores instructions. When the instructions are run on a computer, the computer is enabled to perform the industrial defect recognition method according to the first aspect.

According to a fifth aspect, a computer program product including instructions is provided. When the computer program product runs on a computer, the computer is enabled to perform the industrial defect recognition method according to the first aspect.

Technical effects achieved in the second aspect, the third aspect, the fourth aspect, and the fifth aspect are similar to the technical effects achieved by using the corresponding technical means in the first aspect. Details are not described herein again.

Beneficial effects brought by the technical solutions provided in embodiments of this disclosure include at least the following three aspects:

First, in embodiments of this disclosure, the target region is first extracted from the to-be-recognized image, and then the defect coarse-selection region including the industrial defect is obtained from the target region. Through two times of region extraction, the proportion of the size of the industrial defect to the size of the background is increased, and the probability of detecting a small-sized industrial defect can be increased.

Second, after the defect coarse-selection region including the industrial defect is detected, the localization and size estimation are further performed on the industrial defect in the defect coarse-selection region, so that the precision of the defect localization and size estimation can be effectively improved.

Third, in this embodiment of this disclosure, not only the defect type is recognized, but also the localization and size estimation can be performed on the industrial defect, enriching the recognition dimensions of the industrial defect.

DESCRIPTION OF EMBODIMENTS

To make objectives, technical solutions, and advantages of embodiments of this disclosure clearer, the following further describes implementations of this disclosure in detail with reference to the accompanying drawings.

An application scenario in embodiments of this disclosure is first described before embodiments of this disclosure are described in detail.

In the industrial field, industrial defects may occur in a process of producing, manufacturing, and maintaining industrial products. For example, welding is usually used in a process of manufacturing or maintaining industrial products such as oil and gas pipelines, spacecrafts, and vehicles, and weld seam defects may exist in the weld seams left by welding. For another example, a defect such as a crack or a scratch may exist on a part of a vehicle due to a production or maintenance process problem. Such defects in industrial products usually affect normal use of the industrial products. Therefore, it is necessary to detect the industrial defects in the industrial products. Currently, performing detection based on an image of an industrial product is one of important means of industrial defect detection. One of the main methods is to manually recognize an industrial defect from the image of the industrial product. However, this method is not only unfavorable to health of the staff, but also difficult to ensure quality of recognition. In recent years, with wide application of neural network models in the image recognition field, some methods for recognizing an industrial defect based on a neural network model have emerged to replace manual recognition. However, currently, there are still some problems in the method for recognizing an industrial defect based on a neural network model, which are mainly reflected in two aspects. In an aspect, the method is usually applicable only to recognition of a large-sized defect, and a recognition effect of a small-sized defect is poor. In another aspect, the method can usually recognize only whether an industrial defect exists in an image, but cannot perform localization and size estimation on the industrial defect, meaning a single recognition dimension. Based on this, an embodiment of this disclosure provides a method for recognizing an industrial defect in an industrial product image based on an AI model, to enrich recognition dimensions of the industrial defect, and improve a recognition effect of a small-sized industrial defect.

It should be noted that an industrial defect recognition method provided in embodiments of this disclosure is performed by an industrial defect recognition system 01. The industrial defect recognition system 01 may be implemented by a software system, or may be implemented by a hardware device, or may be implemented by a combination of a software system and a hardware device.

Figure 1:
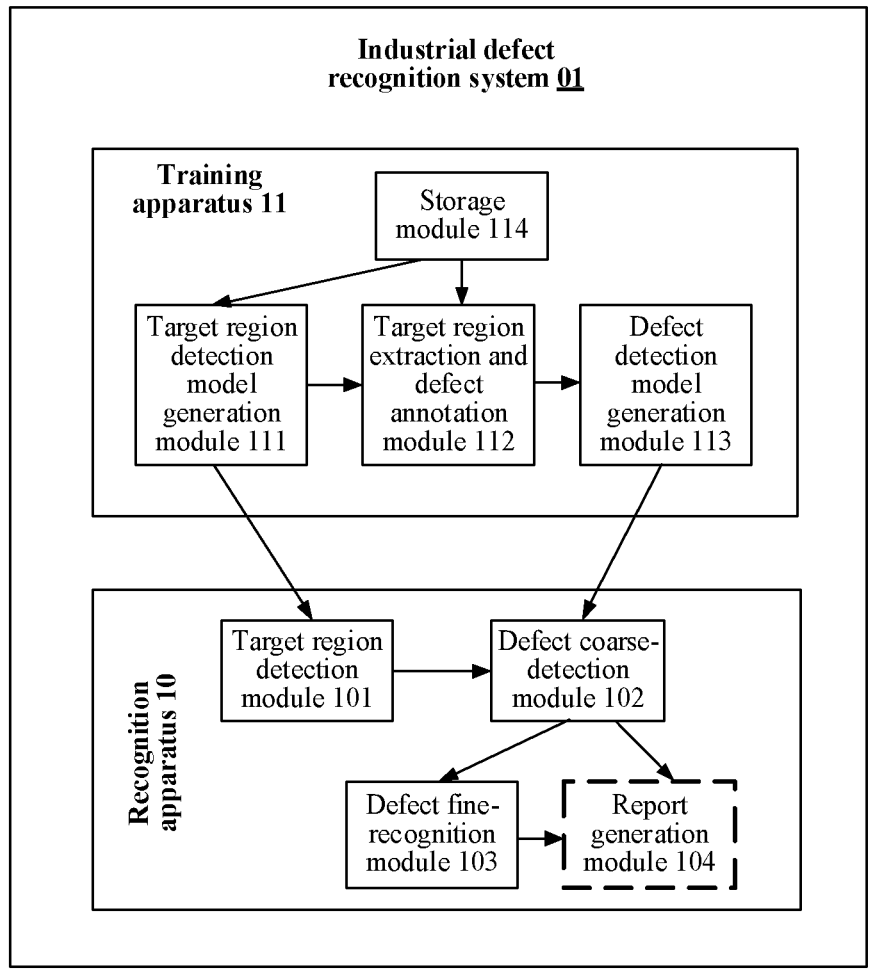
FIG. 1 is a schematic structural diagram of an industrial defect recognition system according to an embodiment of this disclosure.

When the industrial defect recognition system 01 is a software system, refer to FIG. 1. The industrial defect recognition system 01 may be logically divided into a recognition apparatus 10 and a training apparatus 11. The recognition apparatus 10 and the training apparatus 11 each may be logically divided into a plurality of modules, and each module has a different function. For example, with reference to FIG. 1, the recognition apparatus 10 includes a target region detection module 101, a defect coarse-detection module 102, and a defect fine-recognition module 103. It should be noted that division of a structure and functional modules of the recognition apparatus 10 is only an example in embodiments of this disclosure, but specific division is not limited.

The target region detection module 101 is configured to: obtain a to-be-recognized image, and extract at least one target region from the to-be-recognized image based on a target region detection model. The to-be-recognized image is an image including an industrial product. The at least one target region refers to a region in which an industrial defect may exist. For example, in detection of a weld seam defect, the target region may be a region including a complete weld seam in the to-be-recognized image. The target region may be a polygon region. For example, the target region is a multi-degree-of-freedom quadrilateral. The multi-degree-of-freedom quadrilateral means that an included angle or a parallel relationship between each edge of the quadrilateral and an edge of the to-be-recognized image is freely set, and is not limited to a vertical or parallel relationship. In addition, included angles or parallel relationships between four edges of the quadrilateral are freely set, and are not limited to vertical or parallel relationships. In other words, an angle between each edge of the multi-degree-of-freedom quadrilateral and each edge of the to-be-recognized image may be of any degree from 0 degrees to 180 degrees. In addition, adjacent edges of the region of the multi-degree-of-freedom quadrilateral may be vertical or not vertical, and opposite edges may be parallel or not parallel.

It should be noted that the target region detection model is an AI model trained by using an industrial training sample. The target region detection model is used to determine, in the to-be-recognized image, a region of interest, namely, a target region, in which an industrial defect may occur, and output a location of the target region in the to-be-recognized image.

The defect coarse-detection module 102 is configured to: communicate with the target region detection module 101 and the defect fine-recognition module 103, receive the at least one target region extracted by the target region detection module 101, and obtain, based on the at least one target region and a defect detection model, a defect coarse-selection region in a target region that is in the at least one target region and that includes an industrial defect and a type of the industrial defect included in the defect coarse-selection region. The defect detection model is an AI model trained by using a defect training sample. In addition, the defect detection model is used to further detect, in the target region, the defect coarse-selection region including the industrial defect, and output location information of the defect coarse-selection region in the target region. For example, in the detection of the weld seam defect, the defect coarse-selection region may refer to a smaller region, including the weld seam defect, extracted from the region including the complete weld seam. In addition, the defect detection model is further used to output a type of the industrial defect included in the defect coarse-selection region. Certainly, it should be noted that the at least one target region extracted by the target region detection module 101 is a region in which an industrial defect may occur, in other words, some target regions may not include an industrial defect. In this case, after detecting these target regions, the defect detection model outputs a recognition result indicating that there is no defect in the target region.

The defect fine-recognition module 103 is configured to: communicate with the defect coarse-detection module 102, receive the defect coarse-selection region extracted by the defect coarse-detection module 102, and determine a size and a location of the industrial defect included in the defect coarse-selection region.

In some possible implementations, the defect fine-recognition module 103 is further configured to: receive the location information that is of the defect coarse-selection region in the target region and that is sent by the defect coarse-detection module 102, communicate with the target region detection module 101, and receive location information that is of the target region in the to-be-recognized image and that is sent by the target region detection module 101. Then, the defect fine-recognition module 103 determines the size of the industrial defect included in the defect coarse-selection region and the location of the industrial defect in the defect coarse-selection region based on a grayscale distribution in the defect coarse-selection region; and obtains, based on the location information of the defect coarse-selection region in the target region, the location information of the target region including the defect coarse-selection region in the to-be-recognized image, and the location of the industrial defect in the defect coarse-selection region, a location of the industrial defect in the to-be-recognized image.

Optionally, in some possible cases, with reference to FIG. 1, the recognition apparatus 10 may further include a report generation module 104. The report generation module 104 is configured to: communicate with the defect fine-recognition module 103, receive a recognition result sent by the defect fine-recognition module 103, generate a detection report based on the recognition result, and provide the detection report for a user. The recognition result includes the type, the size, and the location of the industrial defect detected in the to-be-recognized image. Correspondingly, the detection report includes the foregoing recognition result. In addition, the detection report may further include other content, for example, may further include information, determined based on the recognition result, about whether the industrial product in the to-be-recognized image is qualified. This is not limited in embodiments of this disclosure.

Optionally, the report generation module 104 is further configured to: communicate with the defect coarse-detection module 102, receive a recognition result that is output by the defect coarse-detection module 102 and that indicates that there is no defect in some target regions, and generate a detection report based on the recognition result.

It can be learned from the foregoing descriptions that both the target region detection model and the defect detection model are trained AI models. Before the two models are used for industrial defect detection, the training apparatus 11 may train a target region detection network to obtain the target region detection model, and train a defect detection network to obtain the defect detection model. With reference to FIG. 1, the training apparatus 11 includes a target region detection model generation module 111, a target region extraction and defect annotation module 112, a defect detection model generation module 113, and a storage module 114.

The target region detection model generation module 111 is configured to: obtain a plurality of industrial training samples from the storage module 114, and train the target region detection network by using the plurality of obtained industrial training samples, to obtain the target region detection model. The plurality of industrial training samples are images including target regions, and the target region is a region in which an industrial defect may occur. In addition, each industrial training sample corresponds to target region annotation information, and the target region annotation information includes location information of a multi-degree-of-freedom quadrilateral annotated in the corresponding industrial training sample and annotation category information indicating that the corresponding multi-degree-of-freedom quadrilateral is a target region.

The target region extraction and defect annotation module 112 is configured to: obtain a plurality of defect training samples from the storage module 114, and extract a target region from each defect training sample based on the trained target region detection model. The plurality of defect training samples are training samples including target regions. After obtaining the target region from each defect training sample, the target region extraction and defect annotation module 112 may further obtain defect annotation information obtained after the user annotates an industrial defect in the target region, where the defect annotation information indicates a defect type and a location of the industrial defect in the corresponding target region.

The defect detection model generation module 113 is configured to: communicate with the target region extraction and defect annotation module 112, receive a plurality of target regions and the defect annotation information of each target region that are sent by the target region extraction and defect annotation module 112, and train the defect detection network based on the plurality of target regions and the defect annotation information of each target region, to obtain the defect detection model.

In embodiments of this disclosure, the training apparatus 11 and the recognition apparatus 10 are two independent apparatuses. In this case, the target region detection model and the defect detection model that are obtained through training by the training apparatus 11 are deployed in the recognition apparatus 10. Optionally, the training apparatus 11 may alternatively be a part of the recognition apparatus 10.

The industrial defect recognition system 01 described above may be flexibly deployed. For example, the industrial defect recognition system 01 is deployed in a cloud environment. The cloud environment is an entity that uses a basic resource to provide a cloud service for the user in a cloud computing mode. The cloud environment includes a cloud data center and a cloud service platform.

Figure 2:
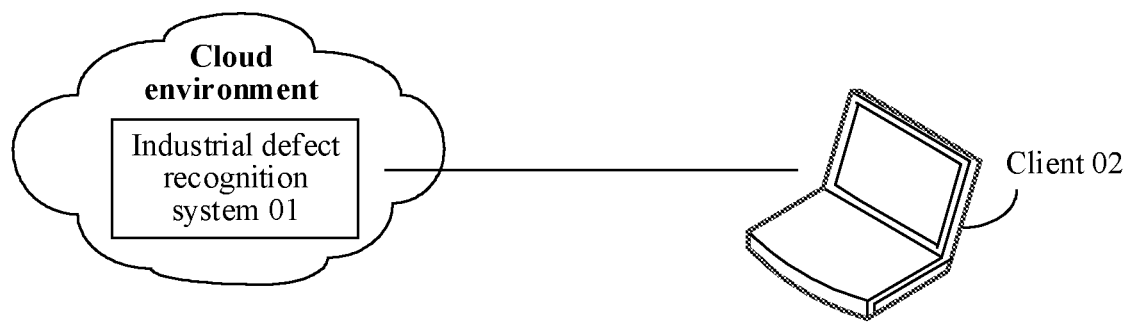
FIG. 2 is a schematic deployment diagram of an industrial defect recognition system according to an embodiment of this disclosure.

The cloud data center includes a large quantity of basic resources (including computing resources, storage resources, and network resources) owned by a cloud service provider. The computing resources included in the cloud data center may be a large quantity of computing devices (for example, servers). The industrial defect recognition system 01 may be a software system deployed on a server or a virtual machine in the cloud data center. The software system may be configured to recognize an industrial defect. The software system may be deployed on a plurality of servers in a distributed manner, or deployed on a plurality of virtual machines in a distributed manner, or deployed on a virtual machine and a server in a distributed manner. For example, as shown in FIG. 2, the industrial defect recognition system 01 is deployed in a cloud environment. A client 02 may send a to-be-recognized image to the industrial defect recognition system 01. After receiving the to-be-recognized image, the industrial defect recognition system 01 may extract at least one target region from the to-be-recognized image based on a target region detection model, and obtain, based on the at least one target region and a defect detection model, a defect coarse-selection region in a target region that is in the at least one target region and that includes an industrial defect and a type of the industrial defect included in the defect coarse-selection region. Then, a size and a location of the industrial defect included in the defect coarse-selection region are determined. Then, the industrial defect recognition system 01 feeds back the type, the location, and the size of the industrial defect obtained through detection to the client 02.

Figure 3:
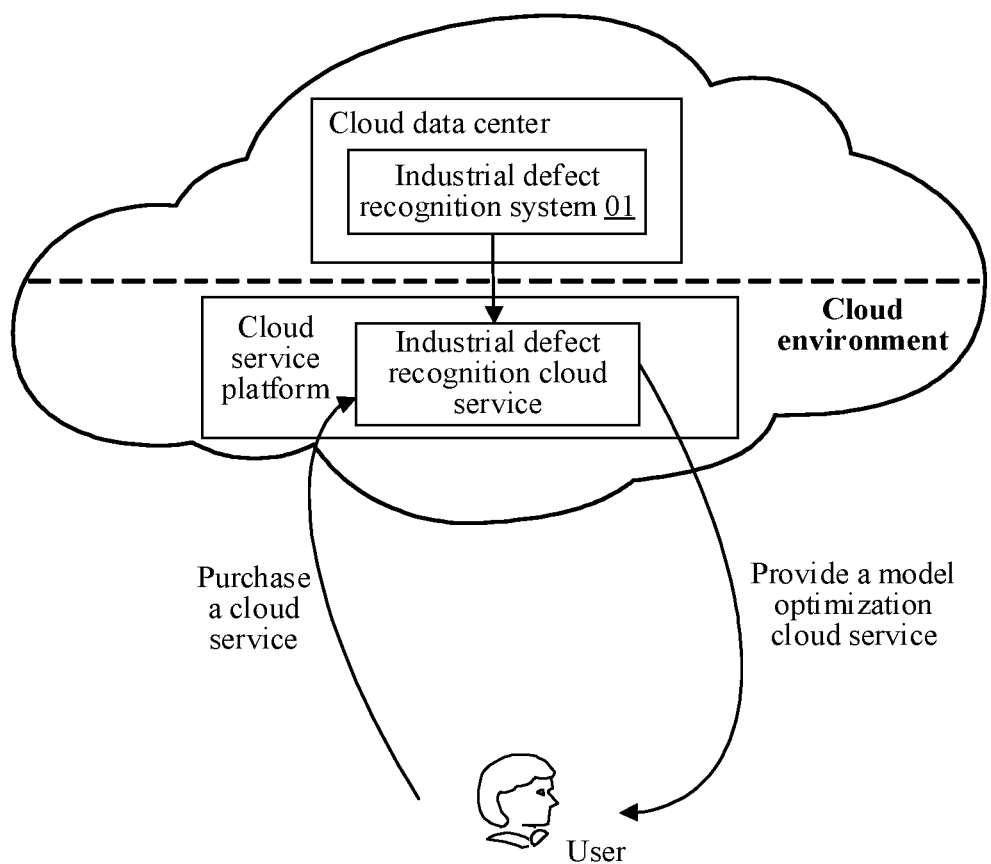
FIG. 3 is a schematic application diagram of an industrial defect recognition system according to an embodiment of this disclosure.

For example, FIG. 3 is a schematic application diagram of the industrial defect recognition system 01 in this disclosure. As shown in FIG. 3, the industrial defect recognition system 01 may be deployed in a cloud data center by a cloud service provider, and the cloud service provider abstracts a function provided by the industrial defect recognition system 01 into a cloud service. A cloud service platform allows a user to consult and purchase the cloud service. After purchasing the cloud service, the user can use an industrial defect recognition service provided by the industrial defect recognition system 01 of the cloud data center. The industrial defect recognition system 01 may further be deployed by a tenant in a computing resource of a cloud data center leased by the tenant. The tenant purchases, by using a cloud service platform, a computing resource cloud service provided by a cloud service provider, and runs the industrial defect recognition system 01 in the purchased computing resource, so that the industrial defect recognition system 01 performs industrial defect recognition.

Figure 4:
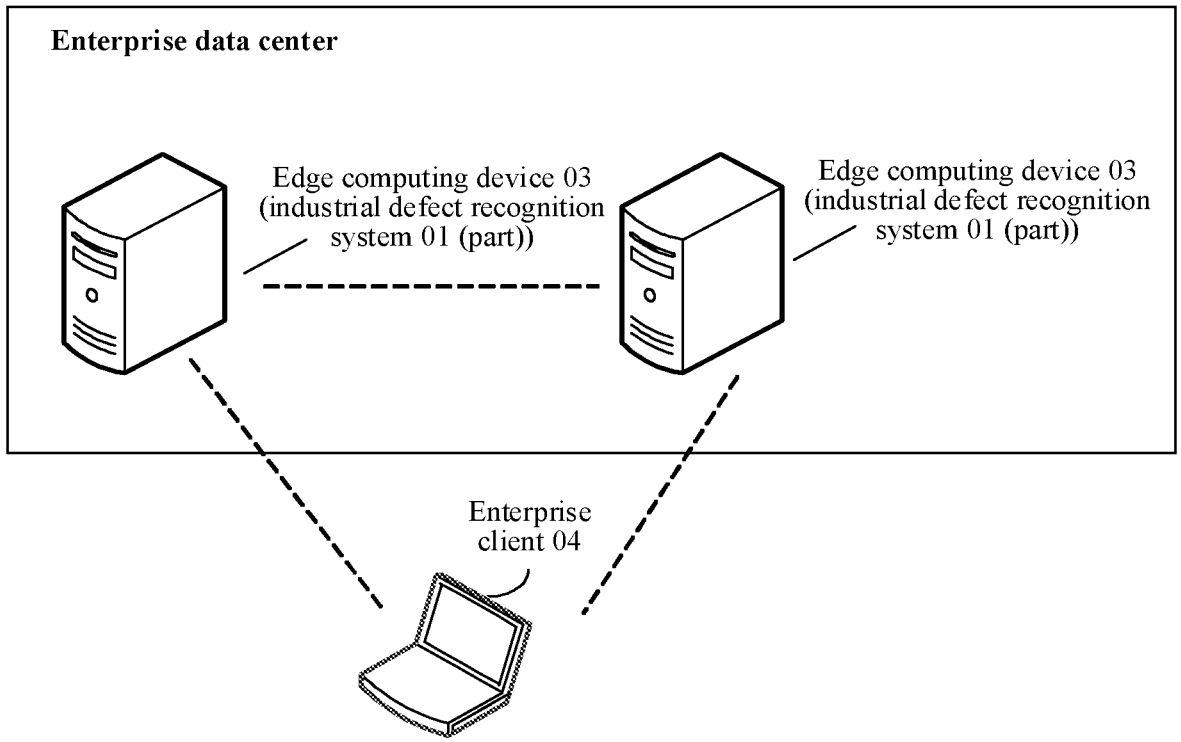
FIG. 4 is a schematic deployment diagram of another industrial defect recognition system according to an embodiment of this disclosure.

Optionally, the industrial defect recognition system 01 may alternatively be a software system that runs on an edge computing device in an edge environment, or one or more edge computing devices in the edge environment. The edge environment is a device set that includes one or more edge computing devices in an application scenario. The one or more edge computing devices may be computing devices in one data center or computing devices in a plurality of data centers. When the industrial defect recognition system 01 is a software system, the industrial defect recognition system 01 may be deployed on a plurality of edge computing devices in a distributed manner, or may be deployed on one edge computing device in a centralized manner. For example, as shown in FIG. 4, the industrial defect recognition system 01 is deployed, in a distributed manner, on edge computing devices 03 included in a data center of an enterprise. A client 04 in the enterprise may send a to-be-recognized image to the industrial defect recognition system 01. After receiving the to-be-recognized image, the industrial defect recognition system 01 may recognize, according to the method provided in embodiments of this disclosure, an industrial defect included in the to-be-recognized image, and feed back a recognition result to the client 04.

Figure 5:
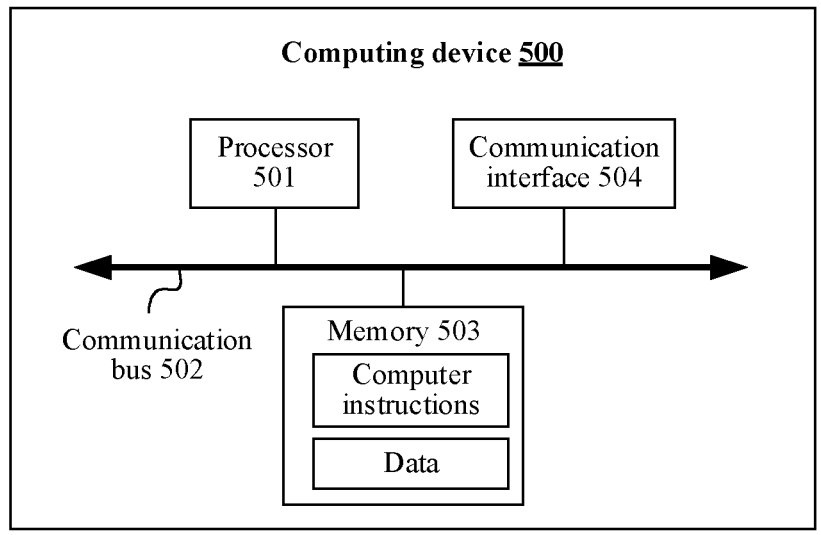
FIG. 5 is a schematic structural diagram of a computing device according to an embodiment of this disclosure.

When the industrial defect recognition system 01 is a hardware device, the industrial defect recognition system 01 may be a computing device in any environment, for example, may be the edge computing device described above, or may be the computing device in the cloud environment described above. FIG. 5 is a schematic structural diagram of a computing device 500 according to an embodiment of this disclosure. The computing device 500 includes a processor 501, a communication bus 502, a memory 503, and at least one communication interface 504.

The processor 501 may be a general-purpose central processing unit (CPU), an application-specific integrated circuit (ASIC), a graphics processing unit (GPU), or any combination thereof. The processor 501 may include one or more chips. The processor 501 may include an AI accelerator, for example, a neural processing unit (NPU).

The communication bus 502 may include a path for transferring information between components (for example, the processor 501, the memory 503, and the communication interface 504) of the computing device 500.

The memory 503 may be a read-only memory (ROM) or another type of static storage device that can store static information and instructions, may be a random-access memory (RAM) or another type of dynamic storage device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a BLU-RAY disc, and the like), a magnetic disk storage medium or another magnetic storage device, or any other medium that can be used to carry or store expected program code in an instruction form or a data structure form and that can be accessed by a computer. However, the memory 503 is not limited thereto. The memory 503 may exist independently, and is connected to the processor 501 through the communication bus 502. Alternatively, the memory 503 may be integrated with the processor 501. The memory 503 may store computer instructions. When the computer instructions stored in the memory 503 are executed by the processor 501, the industrial defect recognition method in this disclosure may be implemented. In addition, the memory 503 may further store data required by the processor in a process of performing the foregoing method, and intermediate data and/or result data generated by the processor.

The communication interface 504 is any apparatus such as a transceiver, and is configured to communicate with another device or a communication network, for example, the Ethernet, a radio access network (RAN), or a wireless local area network (WLAN).

During specific implementation, in an embodiment, the processor 501 may include one or more CPUs.

During specific implementation, in an embodiment, the computing device may include a plurality of processors. Each of these processors may be a single-core processor, or may be a multi-core processor. The processor herein may refer to one or more devices, circuits, and/or processing cores configured to process data (for example, computer program instructions).

In embodiments of this disclosure, an industrial defect recognition system recognizes an industrial defect in a to-be-recognized image by using a target region detection model and a defect detection model. Both the target region detection model and the defect detection model are trained AI models. Based on this, the following first describes training processes of the target region detection model and the defect detection model.

Figure 6:
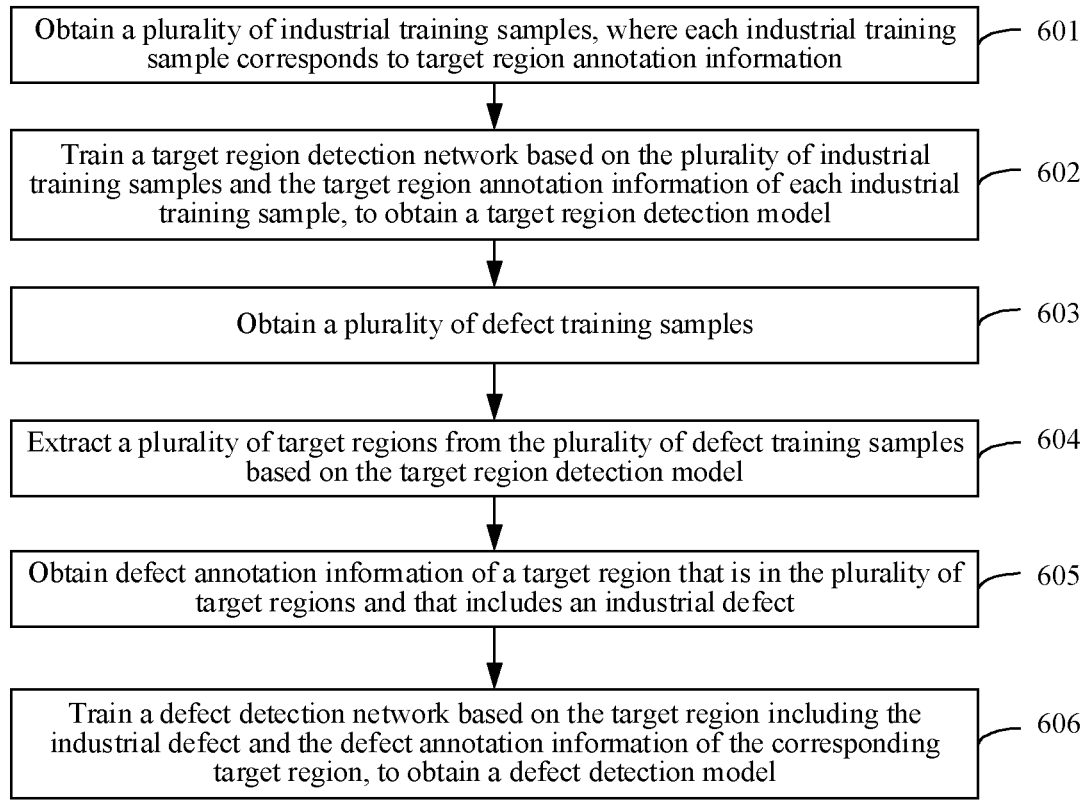
FIG. 6 is a flowchart of training a target region detection model and a defect detection model according to an embodiment of this disclosure.

FIG. 6 is a flowchart of training a target region detection model and a defect detection model according to an embodiment of this disclosure. The method may be applied to the training apparatus in the foregoing industrial defect recognition system. With reference to FIG. 6, the method includes the following steps.

Step 601: Obtain a plurality of industrial training samples, where each industrial training sample corresponds to target region annotation information.

In this embodiment of this disclosure, the training apparatus collects the plurality of industrial training samples. The industrial training sample may be an image collected by another collection device and sent to the training apparatus, for example, may be an image collected by a camera in an industrial environment and sent to the training apparatus. Certainly, the industrial training sample may alternatively be collected by a collection device and then sent to another device for storage, and then sent by the other device to the training apparatus. Alternatively, the industrial training sample may be an image sent by a client to the industrial defect recognition system for recognition. In other words, the training apparatus may collect images that are recognized by the recognition apparatus in the industrial defect recognition system, and use these images as industrial training samples.

It should be noted that the plurality of industrial training samples each are an image including a target region. The target region refers to a region in which an industrial defect may exist. The industrial defect refers to a defect generated in a process of producing, manufacturing, or maintaining an industrial product. For example, the industrial defect is a weld seam defect. Because the weld seam defect occurs only in a region in which a weld seam is located, the target region is a weld seam region in this case. For another example, for an industrial defect, if the industrial defect occurs only on a part of a vehicle, the target region is a region in which the part is located. Details are not described herein in this embodiment of this disclosure.

After obtaining the plurality of industrial training samples, the training apparatus sequentially displays each industrial training sample to a user, so that the user performs target region annotation on each industrial training sample. Then, the training apparatus obtains target region annotation information generated when the user performs annotation on each industrial training sample.

The user annotates a target region in the industrial training sample by using a quadrilateral annotation box, to obtain a quadrilateral including the target region.

It should be noted that the quadrilateral annotation box is a multi-degree-of-freedom quadrilateral annotation box. Correspondingly, the quadrilateral obtained through annotation is also a multi-degree-of-freedom quadrilateral. The multi-degree-of-freedom quadrilateral means that an angle between four edges of the quadrilateral and four edges of the industrial training sample is of any degree from 0 degrees to 180 degrees. In addition, each edge of the multi-degree-of-freedom quadrilateral and each edge of the industrial training sample may be vertical or not vertical, or may be parallel or not parallel. In addition, adjacent edges of the multi-degree-of-freedom quadrilateral may be vertical or not vertical, and opposite edges may be parallel or not parallel.

Figure 7:
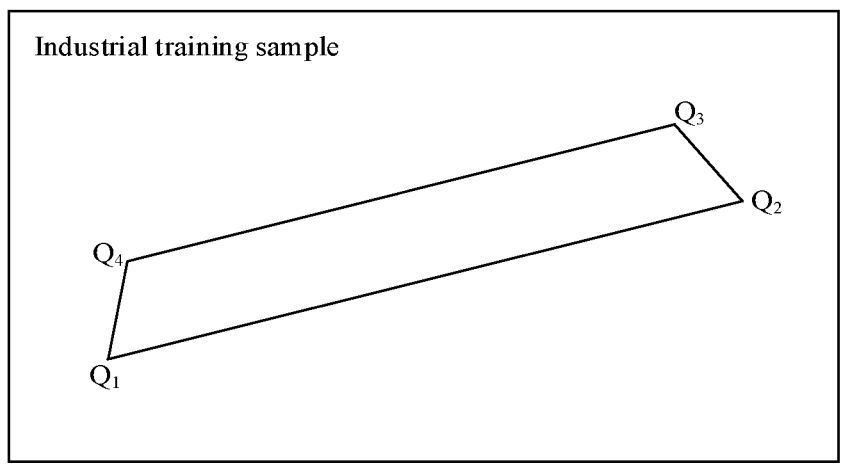
FIG. 7 is a schematic diagram of a multi-degree-of-freedom quadrilateral annotated in an industrial training sample according to an embodiment of this disclosure.

For example, FIG. 7 shows a multi-degree-of-freedom quadrilateral annotated in an industrial training sample according to an embodiment of this disclosure. As shown in FIG. 7, an edge $Q_1Q_2$ of the multi-degree-of-freedom quadrilateral is neither perpendicular nor parallel to each edge of the industrial training sample, and the other three edges are neither perpendicular nor parallel to each side of the industrial training sample. In addition, as shown in FIG. 7, the edge $Q_1Q_2$ of the multi-degree-of-freedom quadrilateral is parallel to an edge $Q_3Q_4$ of the multi-degree-of-freedom quadrilateral, and an edge $Q_1Q_4$ is not parallel to an edge $Q_2Q_3$. In addition, every two adjacent edges of the multi-degree-of-freedom quadrilateral are not perpendicular to each other.

For example, the industrial defect is a weld seam defect, and the target region is a weld seam region. When performing annotation in the industrial training sample by using a quadrilateral annotation box, the user may use the quadrilateral annotation box to enclose a weld seam, to obtain a quadrilateral enclosing the weld seam. It should be noted that, because the weld seam is usually an irregular quadrilateral of a long strip shape, and the weld seam is not horizontal or vertical in the industrial training sample, in this embodiment of this disclosure, the user may use a multi-degree-of-freedom quadrilateral annotation box to select the weld seam. In this way, the multi-degree-of-freedom quadrilateral annotation box can better adapt to the shape of the weld seam, and more closely enclose the weld seam. Therefore, an area of a region that does not include the weld seam defect in a multi-degree-of-freedom quadrilateral obtained through annotation can be reduced as much as possible.

After the user obtains the quadrilateral through annotation in the industrial training sample by using the quadrilateral annotation box, the training apparatus automatically obtains location information of the quadrilateral in the industrial training sample. The location information may include coordinate information of four vertices of the quadrilateral in the industrial training sample.

In addition, for each industrial training sample, after the user obtains the quadrilateral through annotation, the training apparatus may generate annotation category information of the quadrilateral, where the annotation category information indicates that the quadrilateral is a target region. The annotation category information may be a first identifier. For example, the first identifier is "1". Correspondingly, the training apparatus may use the annotation category information and the location information of the quadrilateral as target region annotation information corresponding to the industrial training sample.

Step 602: Train a target region detection network based on the plurality of industrial training samples and the target region annotation information of each industrial training sample, to obtain the target region detection model.

After obtaining the plurality of industrial training samples and the target region annotation information of each industrial training sample, the training apparatus trains the target region detection network based on the plurality of industrial training samples and the target region annotation information of each industrial training sample, to obtain the target region detection model. The following describes the process by using one of the plurality of industrial training samples as an example, where a quadrilateral region obtained through annotation is a multi-degree-of-freedom quadrilateral. For ease of description, the industrial training sample is referred to as a first industrial training sample below.

For example, the training apparatus determines a first bounding rectangle and a second bounding rectangle based on target region annotation information of the first industrial training sample, where the first bounding rectangle is a minimum rotating bounding rectangle of a multi-degree-of-freedom quadrilateral annotated in the first industrial training sample, and the second bounding rectangle is a horizontal bounding rectangle of the first bounding rectangle. The training apparatus determines a predicted value of the multi-degree-of-freedom quadrilateral in the first industrial training sample, a predicted value of the first bounding rectangle, a predicted value of the second bounding rectangle, and prediction category information based on the target region detection network. The training apparatus calculates a loss function value based on the target region annotation information of the first industrial training sample, the first bounding rectangle, the second bounding rectangle, the predicted value of the multi-degree-of-freedom quadrilateral in the first industrial training sample, the predicted value of the first bounding rectangle, the predicted value of the second bounding rectangle, and the prediction category information. The training apparatus performs parameter update on the target region detection network based on the loss function value.

Figure 8:
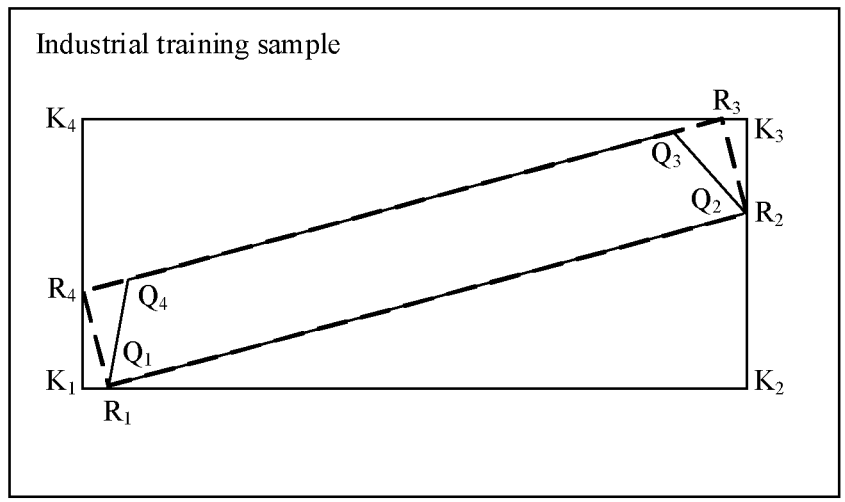
FIG. 8 is a schematic diagram of a multi-degree-of-freedom quadrilateral annotated in an industrial training sample and a generated first bounding rectangle and second bounding rectangle according to an embodiment of this disclosure.

In this embodiment of this disclosure, considering that a degree of freedom of the multi-degree-of-freedom quadrilateral is high and regression is difficult, the training apparatus first determines, in the first industrial training sample, the minimum rotating bounding rectangle of the annotated multi-degree-of-freedom quadrilateral, namely, the first bounding rectangle, and then determines the horizontal bounding rectangle of the first bounding rectangle, namely, the second bounding rectangle. The first bounding rectangle is a bounding rectangle whose four edges each are not parallel to the four edges of the first industrial training sample and whose area is the minimum. The second bounding rectangle is a bounding rectangle that has a minimum area in bounding rectangles of the first bounding rectangle and that has two adjacent edges respectively parallel to two adjacent edges of the first industrial training sample. For example, as shown in FIG. 8, the multi-degree-of-freedom quadrilateral annotated in the first industrial training sample is $Q_1Q_2Q_3Q_4$, the first bounding rectangle is $R_1R_2R_3R_4$, and the second bounding rectangle is $K_1K_2K_3K_4$.

In addition, the training apparatus performs detection in the first industrial training sample based on the target region detection network, to obtain the predicted value of the annotated multi-degree-of-freedom quadrilateral, the predicted value of the first bounding rectangle, the predicted value of the second bounding rectangle, and the prediction category information. The prediction category information indicates whether the predicted value of the annotated multi-degree-of-freedom quadrilateral is a foreground region or a background region. For example, if the predicted value of the annotated multi-degree-of-freedom quadrilateral is a foreground region, the prediction category information is a first identifier; if the predicted value of the annotated multi-degree-of-freedom quadrilateral is a background region, the prediction category information is a second identifier.

After obtaining the predicted value of the annotated multi-degree-of-freedom quadrilateral, the predicted value of the first bounding rectangle, the predicted value of the second bounding rectangle, and the prediction category information based on the target region detection network, the training apparatus may calculate the loss function value by using the predicted value, parameter information of each quadrilateral obtained through annotation, the prediction category information, and annotation category information, and then perform parameter update on the target region detection network based on the loss function value obtained through calculation.

When calculating the loss function value, the training apparatus may perform parameterization on data obtained through annotation and data obtained through prediction, and then calculate the loss function value by using parameter values obtained after the parameterization.

For example, the multi-degree-of-freedom quadrilateral annotated in the first industrial training sample is a quadrilateral whose one group of opposite edges are parallel and another group of opposite edges are not parallel. For example, as shown in FIG. 8, in this case, the multi-degree-of-freedom quadrilateral may be represented by using vertex coordinates of three vertices $Q_1$, $Q_2$, and $Q_3$ of the quadrilateral and a length of an edge $Q_3Q_4$. In other words, parameter information of the multi-degree-of-freedom quadrilateral is $(x_1^Q, y_1^Q, x_2^Q, y_2^Q, x_3^Q, y_3^Q, w^Q)$. $(x_1^Q, y_1^Q)$ is coordinates of the vertex $Q_1$, $(x_2^Q, y_2^Q)$ is coordinates of the vertex $Q_2$, $(x_3^Q, y_3^Q)$ is coordinates of the vertex $Q_3$, and $w_Q$ is the length of the edge $Q_3Q_4$. Similarly, it is assumed that the predicted value of the multi-degree-of-freedom quadrilateral is $q_1q_2q_3q_4$. In this case, parameter information of the predicted value of the multi-degree-of-freedom quadrilateral is $(x_1^q, y_1^q, x_2^q, y_2^q, x_3^q, y_3^q, w^q)$.

The minimum rotating bounding rectangle of the multi-degree-of-freedom quadrilateral in the first industrial training sample, namely, the first bounding rectangle, may be represented by using coordinates of two adjacent vertices of the rectangle and a length of an edge adjacent to an edge formed by the two vertices. For example, as shown in FIG. 8, the first bounding rectangle $R_1R_2R_3R_4$ may be represented by using coordinates of vertices $R_1$ and $R_2$ and a length of an edge $R_2R_3$. In this case, parameter information of the first bounding rectangle is $(x_1^R, y_1^R, x_2^R, y_2^R, h^R)$.

($x_1^R$, $y_1^R$) is coordinates of the vertex $R_1$, ($x_2^R$, $y_2^R$) is coordinates of the vertex $R_2$, and $h_R$ is the length of $R_2R_3$, namely, a height of the first bounding rectangle. Alternatively, the first bounding rectangle may be represented by using coordinates of vertices $R_2$ and $R_3$ and a length of an edge $R_1R_2$. Details are not described in this embodiment of this disclosure. Similarly, it is assumed that the predicted value of the first bounding rectangle is $r_1r_2r_3r_4$. In this case, parameter information of the predicted value of the first bounding rectangle may be ($x_1^r$, $y_1^r$, $x_2^r$, $y_2^r$, $h^r$).

For the second bounding rectangle, because the second bounding rectangle is a horizontal bounding rectangle, the second bounding rectangle may be represented by using coordinates of a vertex and a width and a height of the bounding rectangle. For example, as shown in FIG. 8, the second bounding rectangle $K_1K_2K_3K_4$ may be represented by coordinates of a vertex $K_1$, a length of an edge $K_1K_2$, and a length of an edge $K_2K_3$. In other words, parameter information of the second bounding rectangle may be ($x_1^K$, $y_1^K$, $w^K$, $h^K$). ($x_1^K$, $y_1^K$) is the coordinates of the vertex $K_1$, $w^K$ is a width of the second bounding rectangle, namely, the length of the edge $K_1K_2$, and $h^K$ is a height of the second bounding rectangle, namely, the length of the edge $K_2K_3$. Similarly, it is assumed that the predicted value of the second bounding rectangle is $k_1k_2k_3k_4$. In this case, parameter information of the predicted value of the second bounding rectangle may be ($x_1^k$, $y_1^k$, $w^k$, $h^k$).

For the parameter information, of each quadrilateral, obtained through annotation and the parameter information, of each quadrilateral, obtained through prediction, the training apparatus may parameterize the parameter information based on a horizontal rectangular target region generated in a process of predicting each quadrilateral based on the target region detection network. It is assumed that parameter information of the horizontal rectangular target region generated in the process of predicting each quadrilateral based on the target region detection network is (x, y, w, h). In this case, the training apparatus may parameterize, according to the following formulas (1) to (3), parameter information of the multi-degree-of-freedom quadrilateral annotated in the first industrial training sample and the predicted value of the multi-degree-of-freedom quadrilateral, parameterize parameter information of the first bounding rectangle and the predicted value of the first bounding rectangle according to formulas (1), (2), and (4), and parameterize parameter information of the second bounding rectangle and the predicted value of the second bounding rectangle according to formulas (1) to (4), to obtain a parameter group of each quadrilateral:

$$dx_i^N = \frac{x_i^N - x}{w}; \quad (1)$$

$$dy_i^N = \frac{y_i^N - y}{h}; \quad (2)$$

$$dw^N = \log \frac{w^N}{w}; \text{ and} \quad (3)$$

$$dh^N = \log \frac{h^N}{h}. \quad (4)$$

When the parameter information of the multi-degree-of-freedom quadrilateral annotated in the first industrial training sample and the predicted value of the multi-degree-of-freedom quadrilateral is parameterized according to the formulas (1) to (3), a value of i is 1, 2, 3, and a value of N is Q, q. In this way, a parameter group of the multi-degree-of-freedom quadrilateral may be represented by $u^Q = (dx_1^Q, dy_1^Q, dx_2^Q, dy_2^Q, dx_3^Q, dy_3^Q, dw^Q)$, and a parameter group of the predicted value of the multi-degree-of-freedom quadrilateral may be represented by $u^q = (dx_1^q, dy_1^q, dx_2^q, dy_2^q, dx_3^q, dy_3^q, dw^q)$. When the parameter information of the first bounding rectangle and the predicted value of the first bounding rectangle is parameterized according to the formulas (1), (2), and (4), a value of i is 1, 2, and a value of N is R, r. In this way, a parameter group of the first bounding rectangle may be represented by $u^R = (dx_1^R, dy_1^R, dx_2^R, dy_2^R, dh^R)$, and a parameter group of the predicted value of the first bounding rectangle may be represented by $U^K = (dx_1^K, dy_1^K, dx_2^K, dy_2^K, dh^K)$. When the parameter information of the second bounding rectangle and the predicted value of the second bounding rectangle is parameterized according to the formulas (1) to (4), a value of i is 1, and a value of N is K,k. In this way, a parameter group of the second bounding rectangle may be represented by $u^K = (dx_1^K, dy_1^K, dw^K, dh^K)$, and a parameter group of the predicted value of the second bounding rectangle may be represented by $u^k = (dk_1^k, dy_1^k, dw^k, dh^k)$.

After performing parameterization on the data obtained through annotation and the data obtained through prediction, the training apparatus calculates the loss function value according to the following formula (5) based on the foregoing parameter groups obtained after the parameterization:

$$L = L_{cls}(l_p, l_g) + \lambda_1 l_g L_{reg}^1(u^q, u^Q) + \lambda_2 l_g L_{reg}^2(u^r, u^R) + \lambda_3 l_g L_{reg}^3(u^k, u^K) \quad (5).$$

$L_{cls}(\ )$ is a classification loss function, $l_p$ is the prediction category information, $l_g$ is the annotation category information, $\lambda_1$, $\lambda_2$, and $\lambda_3$ are preset balance factors used to adjust relative contributions of corresponding items in a process of calculating the loss function value, $L_{reg}^1(\ )$ is a regression function of a parameter of the annotated multi-degree-of-freedom quadrilateral, $L_{reg}^2(\ )$ is a regression function of a parameter of the first bounding rectangle, and $L_{reg}^3(\ )$ is a regression function of a parameter of the second bounding rectangle.

After obtaining the loss function value according to the foregoing formula, the training apparatus may perform iterative training on the target region detection network under guidance of the loss function value obtained through calculation, to obtain the target region detection model.

It should be noted that the foregoing parameters used to represent each quadrilateral obtained through annotation and each quadrilateral obtained through prediction are merely examples provided in this embodiment of this disclosure. In some possible scenarios, each quadrilateral may be represented by using other parameter information. For example, coordinates of four vertices of each quadrilateral are used to represent the corresponding quadrilateral. This is not limited in this embodiment of this disclosure.

Step 603: Obtain a plurality of defect training samples.

In this embodiment of this disclosure, the training apparatus collects the plurality of defect training samples. The plurality of defect training samples are images including target regions. It should be noted that, in some possible cases, there is no intersection between the plurality of defect training samples and the plurality of industrial training samples used for training to obtain the target region detection model. In some other possible cases, the plurality of defect training samples may include an industrial training sample that is in the plurality of industrial training samples and that includes an industrial defect.

Step 604: Extract a plurality of target regions from the plurality of defect training samples based on the target region detection model.

After obtaining the target region detection model through training and obtaining the defect training samples, the training apparatus extracts a target region from each defect training sample based on the target region detection model.

It should be noted that, because the target region detection model is obtained through training by annotating, in the industrial training sample, a quadrilateral in which an industrial defect may exist, the target region detection model uses a multi-degree-of-freedom quadrilateral as a detection box. In this way, based on the target region detection model, a target region in which an industrial defect may exist and whose shape is a quadrilateral can be detected from each defect training sample. When the quadrilateral used during training is a multi-degree-of-freedom quadrilateral, the quadrilateral detected from each defect training sample is also a multi-degree-of-freedom quadrilateral. However, during subsequent training of a defect detection network, a training sample input into the defect detection network is usually required to be a rectangle. Therefore, in this embodiment of this disclosure, after the target region is detected, the training apparatus may further determine a minimum bounding rectangle of the target region, fill a background color between the minimum bounding rectangle and the target region, extract the minimum bounding rectangle from the defect training sample, and use an extracted image as an input of the subsequent training of the defect detection network.

For example, for a target region detection model for detecting a weld seam defect, a weld seam may be annotated by using a multi-degree-of-freedom quadrilateral in each industrial training sample used to train the target region detection model. In this way, a target region that includes the weld seam and whose shape is a multi-degree-of-freedom quadrilateral can be detected from the defect training sample by using the target region detection model. The training apparatus may determine a minimum bounding rectangle of the target region, fill a background color between the minimum bounding rectangle and the target region, and then extract, from the defect training sample, the minimum bounding rectangle including the target region.

Step 605: Obtain defect annotation information of a target region that is in the plurality of target regions and that includes an industrial defect.

After the target region is extracted from each defect training sample, because the target region may include or may not include an industrial defect, the training apparatus may display the plurality of extracted target regions to the user, and the user selects, from the plurality of target regions, the target region that includes the industrial defect, and annotates the industrial defect in the target region including the industrial defect. Then, the training apparatus obtains defect annotation information generated when the user performs annotation in each target region.

The user may annotate, by using a horizontal rectangular annotation box, the industrial defect included in the target region, and input, in a defect type option, a defect type of the industrial defect included in the horizontal rectangular annotation box. Correspondingly, the training apparatus obtains a location of the horizontal rectangular annotation box annotated by the user in the target region, and uses the location as a location of the industrial defect included in the target region. In addition, the training apparatus obtains the defect type, of the industrial defect, input by the user. The obtained location and defect type of the industrial defect are used as the defect annotation information of the target region.

It should be noted that, when the industrial defect included in the target region is annotated by using the horizontal rectangular annotation box, the horizontal rectangular annotation box may have an area as small as possible when enclosing the industrial defect, in other words, the horizontal rectangular annotation box may tightly enclose the industrial defect. When obtaining the location of the horizontal rectangular annotation box, the training apparatus may obtain a location of a center point of the horizontal rectangular annotation box.

Step 606: Train the defect detection network based on the target region including the industrial defect and the defect annotation information of the corresponding target region, to obtain the defect detection model.

After obtaining the target region including the industrial defect and the defect annotation information of the corresponding target region, the training apparatus trains the defect detection network based on each target region including an industrial defect and corresponding defect annotation information, to obtain the defect detection model.

It can be learned from the descriptions in the foregoing step 604 that, when the target region is extracted, the minimum bounding rectangle including the target region may be extracted. Based on this, for any target region including an industrial defect, the training apparatus inputs a minimum bounding rectangle including the target region to the defect detection network, and the defect detection network recognizes the industrial defect included in the target region, to obtain a predicted location and a predicted defect type of the industrial defect included in the target region. The training apparatus calculates a location loss function value based on the predicted location of the industrial defect and an annotated defect location included in defect annotation information of the target region, and calculates a type loss function value based on the predicted defect type of the industrial defect and an annotated defect type included in the defect annotation information. Then, the training apparatus performs parameter update on the defect detection network based on the location loss function value and the type loss function value, to obtain the defect detection model.

In this embodiment of this disclosure, the target region that may include an industrial defect in the industrial training sample is annotated by using the multi-degree-of-freedom quadrilateral, and the target region detection network is trained based on the industrial training sample, to obtain the target region detection model. In this way, the target region detection model can more accurately detect various target regions that may include a defect and that are distributed in different directions and forms in the image. In addition, in this embodiment of this disclosure, the target region detection model is first obtained through training, and then coarse localization is performed on the industrial defect included in the defect training sample based on the target region detection model, to extract the target region. Further, the defect detection network is trained based on the fine location and the defect type of the defect annotated in the target region, to obtain the defect detection model. In this way, when the target region extracted from the to-be-recognized image is subsequently detected based on the defect detection model, more accurate localization of the industrial defect in the target region can be obtained, and the specific defect type of the industrial defect can be output. This not only improves localization accuracy, but also enriches recognition dimensions of the defect.

The foregoing embodiment mainly describes the process of training the target region detection model and the defect detection model. The following describes a process of recognizing a to-be-recognized image based on the target region detection model and the defect detection model.

Figure 9:
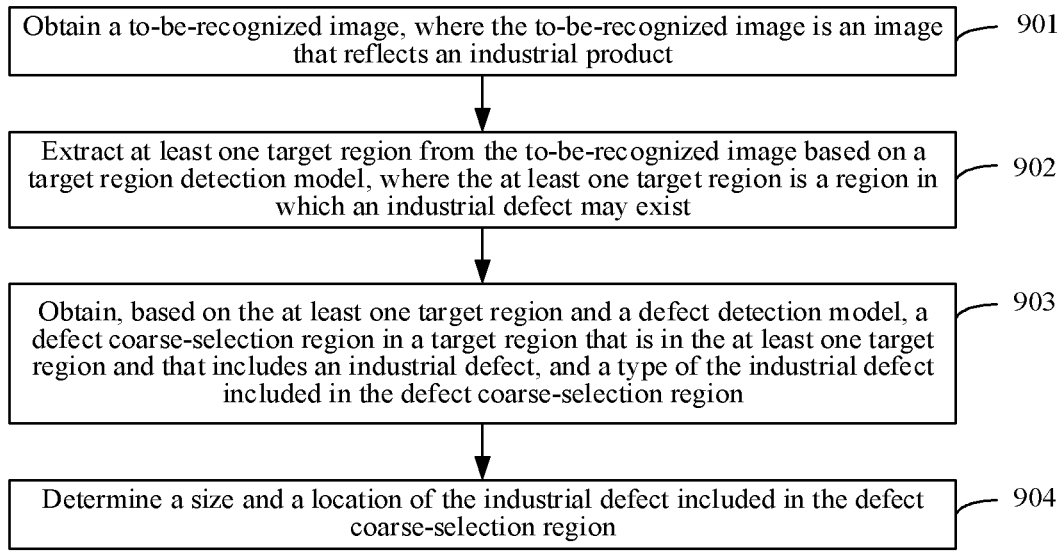
FIG. 9 is a flowchart of an industrial defect recognition method according to an embodiment of this disclosure.

FIG. 9 is a flowchart of an industrial defect recognition method according to an embodiment of this disclosure. The method may be applied to the recognition apparatus in the foregoing industrial defect recognition system. With reference to FIG. 9, the method includes the following steps.

Step 901: Obtain a to-be-recognized image, where the to-be-recognized image is an image that reflects an industrial product.

In this embodiment of this disclosure, the recognition apparatus obtains the to-be-recognized image. The to-be-recognized image is stored in the recognition apparatus, or the to-be-recognized image is sent by another device to the recognition apparatus. The other device may be a device that collects the to-be-recognized image, or may be a device that stores the to-be-recognized image. This is not limited in this embodiment of this disclosure.

Step 902: Extract at least one target region from the to-be-recognized image based on a target region detection model, where the at least one target region is a region in which an industrial defect may exist.

After obtaining the to-be-recognized image, the recognition apparatus uses the to-be-recognized image as an input of the target region detection model, and extracts the at least one target region from the to-be-recognized image based on the target region detection model. The at least one target region is a region in which an industrial defect may exist, in other words, the at least one target region is a region in which an industrial defect may occur.

For example, one target region is used as an example. The recognition apparatus determines the target region in the to-be-recognized image based on the target region detection model, and outputs a location of the target region in the to-be-recognized image. Then, the recognition apparatus obtains, based on the location of the target region in the to-be-recognized image, a minimum bounding rectangle that includes the target region. The location of the target region in the to-be-recognized image may be represented by coordinates of vertices of the target region, or may be represented by using another parameter based on a shape of the target region. This is not limited in this embodiment of this disclosure.

It should be noted that, because the target region detection model is obtained through training by annotating a quadrilateral in an industrial training sample, a target region whose shape is a quadrilateral can be determined in the to-be-recognized image based on the target region detection model. When the quadrilateral used during training is a multi-degree-of-freedom quadrilateral, the target region determined in the to-be-recognized image is also a multi-degree-of-freedom quadrilateral. An industrial defect in a first region needs to be subsequently detected based on a defect detection model, and an image input into the defect detection model is usually required to be a rectangle. Therefore, in this embodiment of this disclosure, after the target region is detected, the recognition apparatus may further determine the minimum bounding rectangle of the target region, fill a background color between the minimum bounding rectangle and the target region, and then crop the to-be-recognized image based on the minimum bounding rectangle of the target region, to obtain an image including the target region.

For example, in a scenario of recognizing a weld seam defect, when a target region detection model is trained, a weld seam is annotated by using a multi-degree-of-freedom quadrilateral annotation box in an industrial training sample. In this way, when the target region detection model is used to detect a to-be-recognized image including a weld seam, a multi-degree-of-freedom target region including the weld seam can be recognized from the to-be-recognized image. Then, the recognition apparatus may determine a minimum bounding rectangle of the target region, fill a background color in a gap between the target region and the minimum bounding rectangle, and extract the minimum bounding rectangle from the to-be-recognized image, to obtain an image including the target region.

Step 903: Obtain, based on the at least one target region and the defect detection model, a defect coarse-selection region in a target region that is in the at least one target region and that includes an industrial defect, and a type of the industrial defect included in the defect coarse-selection region.

After obtaining the at least one target region through extraction based on the target region detection model, the recognition apparatus uses the at least one target region as an input of the defect detection model, and performs inference based on the defect detection model, to obtain a location, in the target region, of the defect coarse-selection region that is in the at least one target region and that includes the industrial defect, and the defect type of the industrial defect included in the defect coarse-selection region. Then, the recognition apparatus extracts the defect coarse-selection region from the target region based on the location of the defect coarse-selection region in the target region.

One of the at least one target region is still used as an example. The recognition apparatus inputs an image including the target region into the defect detection model. The defect detection model processes the target region. It should be noted that, because the target region is a region in which an industrial defect may occur, the target region may include or may not include an industrial defect. Based on this, if the target region does not include an industrial defect, the defect detection model outputs a recognition result indicating that there is no defect in the target region. If the target region includes an industrial defect, the defect detection model can determine a defect coarse-selection region in the target region and recognize the industrial defect in the defect coarse-selection region. Then, the defect detection model outputs a location of the defect coarse-selection region in the target region and a defect type of the industrial defect in the recognized defect coarse-selection region. After obtaining the location of the defect coarse-selection region in the target region, the recognition apparatus prunes the target region based on the location, to obtain the defect coarse-selection region. The location of the defect coarse-selection region in the target region may also be represented by using vertex coordinates of the defect coarse-selection region, or may be represented by using another parameter based on a shape of the defect coarse-selection region.

It should be noted that, when the defect detection model is trained, if a target region extracted from a defect training sample is an industrial defect annotated by using a horizontal rectangular annotation box, in this step, the defect coarse-selection region determined in the target region is also a horizontal rectangular region.

For example, in a scenario of recognizing a weld seam defect, a target region including a weld seam is extracted from a to-be-recognized image based on a target region detection model, and the target region is input into a defect detection model. The defect detection model processes the target region, to determine, in the target region, a horizontal rectangular region including a weld seam defect. The horizontal rectangular region is extracted from the target region based on a location of the determined horizontal rectangular region, to obtain a defect coarse-selection region. In this case, the defect coarse-selection region is a region that includes the weld seam defect and has a smaller area than the target region. In this way, a proportion of the weld seam defect in the defect coarse-selection region is greater than a proportion of the weld seam defect in the target region.

It can be learned from the foregoing descriptions that, the target region extracted based on the target region detection model is a region that is of a large range and in which an industrial defect may occur, and the defect coarse-selection region obtained based on the defect detection model is a region that is extracted by narrowing down the range based on the target region, that is smaller than the target region, and that includes an industrial defect. In this way, a proportion of the industrial defect in the target region is greater than a proportion of the industrial defect in the to-be-recognized image, and a proportion of the industrial defect in the defect coarse-selection region is greater than the proportion of the industrial defect in the target region. In other words, a proportion of the industrial defect to the background is gradually increased by extracting the target region from the to-be-recognized image and then extracting the defect coarse-selection region from the target region. Based on this, localization and size estimation are further performed on the industrial defect in the defect coarse-selection region, so that precision of the defect localization and size estimation can be improved. Especially for a small-sized industrial defect, a proportion of the industrial defect in an image is continuously enlarged by using the foregoing method, which is more conducive to subsequent localization and size estimation of the industrial defect.

For each of the at least one target region extracted from the to-be-recognized image, the recognition apparatus can perform detection on the at least one target region with reference to the foregoing method, to obtain, from the at least one target region, a defect coarse-selection region in a target region including an industrial defect, and a type of the industrial defect included in the defect coarse-selection region.

Step 904: Determine a size and a location of the industrial defect included in the defect coarse-selection region.

After obtaining the defect coarse-selection region and the defect type of the industrial defect included in the defect coarse-selection region in step 903, the recognition apparatus may further determine, by dividing the defect coarse-selection region, the size and the location of the industrial defect included in the defect coarse-selection region.

In a possible implementation, if the defect coarse-selection region is not a grayscale image, the recognition apparatus first performs a graying operation on the defect coarse-selection region. Certainly, if the defect coarse-selection region is a grayscale image, a graying operation does not need to be performed. On this basis, the recognition apparatus determines, based on a grayscale distribution in the grayed defect coarse-selection region, the size of the industrial defect included in the defect coarse-selection region and the location of the industrial defect in the defect coarse-selection region, and determines, based on the location of the defect coarse-selection region in the target region, the location of the target region in the to-be-recognized image, and the location, in the defect coarse-selection region, of the industrial defect included in the defect coarse-selection region, a location, in the to-be-recognized image, of the industrial defect included in the defect coarse-selection region.

It should be noted that, because a grayscale of an industrial defect part in an image is usually different from a grayscale of a non-defect part, in this embodiment of this disclosure, the recognition apparatus may use an intra-region adaptive threshold binarization method, to determine the location and the size of the industrial defect in the defect coarse-selection region based on the grayscale distribution in the region.

The recognition apparatus determines a grayscale threshold based on the grayscale distribution in the grayed defect coarse-selection region. Then, the recognition apparatus compares a grayscale value of each pixel in the grayed defect coarse-selection region with the grayscale threshold. If a grayscale value of a corresponding pixel is less than the grayscale threshold, the grayscale value of the corresponding pixel is set to a first value. If a grayscale value of a corresponding pixel is not less than the grayscale threshold, the grayscale value of the pixel is set to a second value. The first value is not equal to the second value. For example, the first value is 0, and the second value is 255. According to the foregoing method, the recognition apparatus binarizes the grayscale value of each pixel in the grayed defect coarse-selection region. Then, the recognition apparatus determines the location and the size of the industrial defect based on a pixel whose grayscale value is the first value in the grayed defect coarse-selection region.

After determining the location of the industrial defect in the defect coarse-selection region, the recognition apparatus obtains a location of the industrial defect in the target region through coordinate conversion between the target region and the defect coarse-selection region based on the location of the industrial defect in the defect coarse-selection region and the location of the defect coarse-selection region in the corresponding target region. Then, the recognition apparatus obtains a location of the industrial defect in the to-be-recognized image through coordinate conversion between the target region and the to-be-recognized image based on the location of the industrial defect in the target region and the location of the target region in the to-be-recognized image.

It should be noted that, in some possible cases, the recognition apparatus may also directly use the determined location of the industrial defect in the defect coarse-selection region as a finally obtained location of the industrial defect.

After obtaining the location and the size of the industrial defect, the recognition apparatus may generate a detection report, and feed back the detection report to a client. The detection report includes the defect type, the size, and the location of the industrial defect detected in the to-be-recognized image. Optionally, the detection report may further include other content, for example, may further include information, determined based on the recognition result, about whether the industrial product in the to-be-recognized image is qualified. This is not limited in this embodiment of this disclosure.

Optionally, if the defect detection model outputs, when performing detection on the target region, the recognition result indicating that there is no defect in the target region, the recognition apparatus generates a detection report including the recognition result indicating that there is no defect in the target region, and feeds back the detection report to the client.

In conclusion, beneficial effects brought by the industrial defect recognition method provided in this embodiment of this disclosure include at least the following four aspects:

First, in this embodiment of this disclosure, when the target region is extracted, a neural network detection model that uses a multi-degree-of-freedom quadrilateral as a detection box is used, and is applicable to different types of target regions. The target region detection model has good universality.

Second, in this embodiment of this disclosure, the target region is first extracted from the to-be-recognized image, and then the defect coarse-selection region including the industrial defect is obtained from the target region. Through two times of region extraction, the proportion of the size of the industrial defect to the size of the background is increased, so that a probability of detecting a small-sized industrial defect can be increased.

Third, after the defect coarse-selection region including the industrial defect is detected, the localization and size estimation are further performed on the industrial defect in the defect coarse-selection region, so that the precision of the defect localization and size estimation can be effectively improved.

Fourth, in this embodiment of this disclosure, not only the defect type is recognized, but also the localization and size estimation can be performed on the industrial defect, enriching recognition dimensions of the industrial defect.

An embodiment of this disclosure further provides a recognition apparatus 10 shown in FIG. 1. Modules included in the recognition apparatus 10 and functions are described above, and details are not described herein again.

In some embodiments, a target region detection module 101 in the recognition apparatus 10 is configured to perform steps 901 and 902 in the foregoing embodiment. A defect coarse-detection module 102 is configured to perform steps 903 in the foregoing embodiment. A defect fine-recognition module 103 is configured to perform step 904 in the foregoing embodiment.

Optionally, the recognition apparatus 10 may further include a report generation module 104. The report generation module 104 may be configured to: generate a detection report including a recognition result, and provide the detection report for a user.

This disclosure further provides a training apparatus 11 shown in FIG. 1. Modules included in the training apparatus 11 and functions are described above, and details are not described herein again.

In some embodiments, a target region detection model generation module 111 in the training apparatus 11 may be configured to perform step 601 and step 602 in the foregoing embodiment. A target region extraction and defect annotation module 112 may be configured to perform step 603 to step 605 in the foregoing embodiment. A defect detection model generation module 113 may be configured to perform step 606 in the foregoing embodiment.

An embodiment of this disclosure further provides a computing device 500 shown in FIG. 5. A processor 501 in the computing device 500 reads a group of computer instructions stored in a memory 503 to perform the foregoing industrial defect recognition method.

Figure 10:
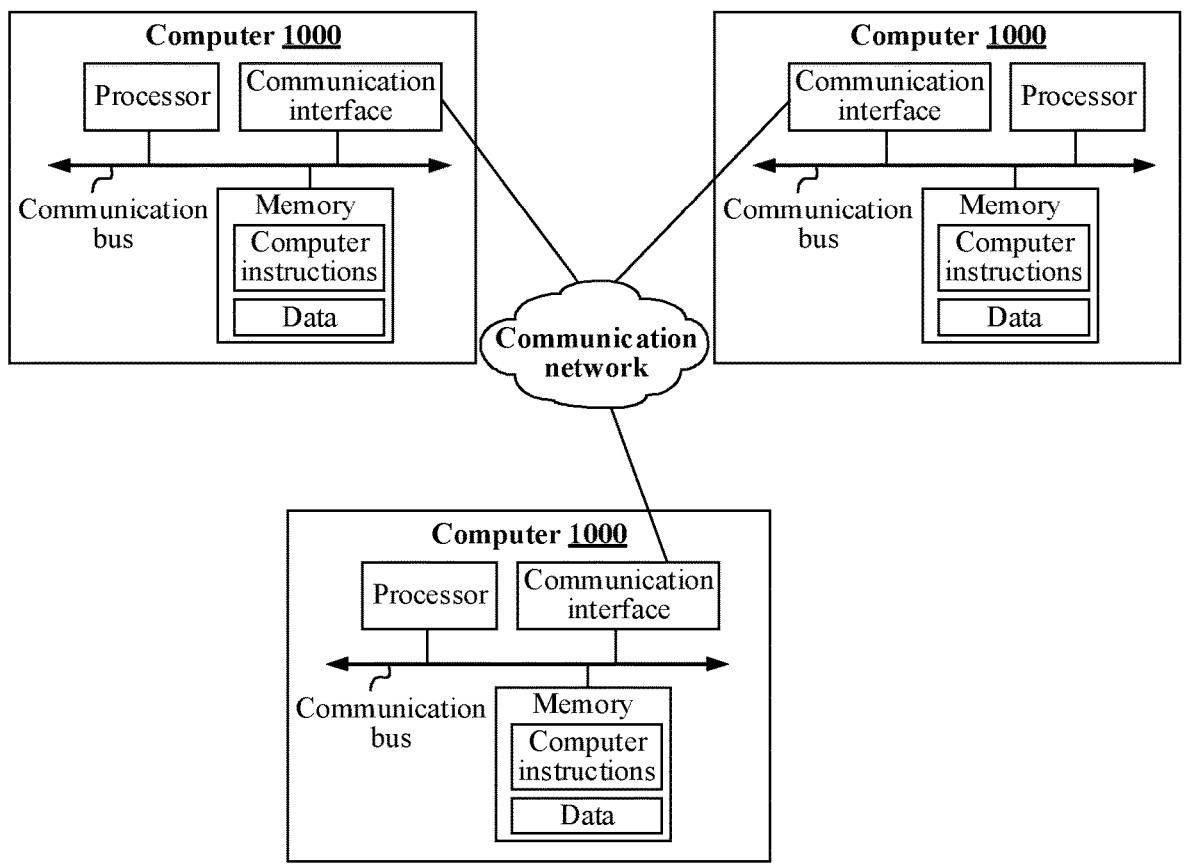
FIG. 10 is a schematic structural diagram of a computer system according to an embodiment of this disclosure.

The modules in the recognition apparatus 10 provided in embodiments of this disclosure may be deployed in a distributed manner on a plurality of computers in a same environment or in different environments. Therefore, this disclosure further provides a computing device (which may also be referred to as a computer system) shown in FIG. 10. The computer system includes a plurality of computers 1000. A structure of each computer 1000 is the same as or similar to a structure of the computing device 500 in FIG. 5. Details are not described herein again.

A communication path is established between the computers 1000 by using a communication network. Any one or more of the target region detection module 101, the defect coarse-detection module 102, the defect fine-recognition module 103, and the report generation module 104 run on each computer 1000. Any computer 1000 may be a computer (for example, a server) in a cloud data center, an edge computer, or a terminal computing device.

The descriptions of procedures corresponding to the foregoing accompanying drawings have respective focuses. For a part that is not described in detail in a procedure, refer to related descriptions of another procedure.

All or some of the foregoing embodiments may be implemented by software, hardware, firmware, or any combination thereof. When software is used to implement the embodiments, all or some of the embodiments may be implemented in a form of a computer program product. A computer program product for implementing industrial defect recognition includes one or more computer instructions for performing industrial defect recognition. When these computer program instructions are loaded and executed on a computer, procedures or functions described in FIG. 6 and FIG. 9 according to embodiments of this disclosure are completely or partially generated.

The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

It should be understood that "at least one" mentioned in this specification means one or more and "a plurality of" means two or more. In descriptions of this specification, "I" means "or" unless otherwise specified. For example, AB may represent A or B. In this specification, "and/or" describes only an association relationship for describing associated objects and represents that three relationships may exist. For example, A and/or B may represent the following three cases: only A exists, both A and B exist, and only B exists. In addition, to clearly describe the technical solutions in embodiments of this disclosure, terms such as "first" and "second" are used in embodiments of this disclosure to distinguish between same items or similar items that have basically the same functions and purposes. A person skilled in the art may understand that the terms such as "first" and "second" do not limit a quantity and an execution sequence, and the terms such as "first" and "second" do not indicate a definite difference.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are not intended to limit embodiments of this disclosure. Any modification, equivalent replacement, or improvement made without departing from the spirit and principle of embodiments of this disclosure shall fall within the protection scope of embodiments of this disclosure.

What is claimed is:

1. A method, comprising:
obtaining a to-be-recognized image, wherein the to-be-recognized image is of an industrial product;
extracting, based on a target region detection model, at least one target region from the to-be-recognized image, wherein the at least one target region comprises a first industrial defect;
obtaining, based on the at least one target region and a defect detection model, a defect coarse-selection region and a first defect type of the first industrial defect, wherein the defect coarse-selection region is in a first target region of the at least one target region, and wherein the defect coarse-selection region comprises the first industrial defect; and
determining a size and a first location of the first industrial defect.

2. The method of according to claim 1, wherein obtaining the defect coarse-selection region comprises:
using the at least one target region as an input of the defect detection model, wherein the defect detection model comprises an artificial intelligence (AI) model trained by using a defect training sample;
performing, based on the defect detection model, an inference to obtain a second location of the defect coarse-selection region in the target region and to obtain the first defect type; and
extracting, based on the second location, the defect coarse-selection region.

3. The method of to claim 1, wherein determining the size and the first location comprises:
determining, based on a grayscale distribution in the defect coarse-selection region, the size and the first location; and
determining, based on the first location, a second location of the defect coarse-selection region in the first target region, and a third location of the first target region in the to-be-recognized image, a fourth location of the first industrial defect a location, in the to-be-recognized image.

4. The method of claim 3, further comprising:
generating a detection report, wherein the detection report comprises the first defect type, the size, and the fourth location; and
providing, for a user, providing the detection report.

5. The method of claim 1, wherein the first industrial defect comprises a weld seam defect, and wherein the first target region comprises a weld seam.

6. The method of claim 1, further comprising:
obtaining a plurality of industrial training samples, wherein each industrial training sample corresponds to target region annotation information, and wherein the target region annotation information comprises location information of a multi-degree-of-freedom quadrilateral annotated in the corresponding industrial training sample and annotation category information indicating that the corresponding multi-degree-of-freedom quadrilateral is a second target region; and
training, based on the plurality of industrial training samples and the target region annotation information, a target region detection network to obtain the target region detection model.

7. The method of claim 1, further comprising:
obtaining a plurality of defect training samples;
extracting, based on the target region detection model, a plurality of second target regions;
obtaining defect annotation information of a third target region that is in the plurality of second target regions and that comprises a second industrial defect, wherein the defect annotation information indicates a second defect type and a second location of the second industrial defect in the third target region; and
training, based on the third target region, training a defect detection network to obtain the defect detection model.

8. The method of claim 1, wherein the target region detection model uses a multi-degree-of-freedom quadrilateral as a detection box, and wherein an angle between each edge of the multi-degree-of-freedom quadrilateral and each edge of the to-be-recognized image comprises any degree from 0 degrees to 180 degrees.

9. An apparatus, comprising:
a memory configured to store instructions; and
one or more processors coupled to the memory and configured to execute the instructions to:
obtain a to-be-recognized image, wherein the to-be-recognized image is of an industrial product;
extract, based on a target region detection model, at least one target region from the to-be-recognized image, wherein the at least one target region comprises a first industrial defect;
obtain, based on the at least one target region and a defect detection model, a defect coarse-selection region and a first defect type of the first industrial defect, wherein the defect coarse-selection region is in a first target region of the at least one target region, and wherein the defect coarse-selection region comprises the first industrial defect; and
determine a size and a first location of the first industrial defect.

10. The apparatus of claim 9, wherein the one or more processors are further configured to execute the instructions to:
use the at least one target region as an input of the defect detection model, wherein the defect detection model comprises an artificial intelligence (AI) model trained by using a defect training sample;
perform, based on the defect detection model, inference to obtain a second location of the defect coarse-selection region in the target region and the first defect type; and
extract, based on the second location, the defect coarse-selection region.

11. The apparatus of claim 9, wherein the one or more processors are further configured to execute the instructions to:
determine, based on a grayscale distribution in the defect coarse-selection region, the size of the first location; and
determine, based on the first location, a second location of the defect coarse-selection region in the first target region, and a third location of the first target region in the to-be-recognized image, a fourth location of the first industrial defect in the to-be-recognized image.

12. The apparatus of claim 11, wherein the one or more processors are further configured to execute the instructions to:
  generate a detection report, wherein the detection report comprises the first defect type, the size, and the fourth location; and
  provide, for a user, the detection report.

13. The apparatus of claim 9, wherein the first industrial defect comprises a weld seam defect, and wherein the first target region comprises a weld seam.

14. The apparatus of claim 9, wherein the one or more processors are further configured to execute the instructions to:
  obtain a plurality of industrial training samples, wherein each industrial training sample corresponds to target region annotation information, and wherein the target region annotation information comprises location information of a multi-degree-of-freedom quadrilateral annotated in the corresponding industrial training sample and annotation category information indicating that the corresponding multi-degree-of-freedom quadrilateral is a second target region; and
  train, based on the plurality of industrial training samples and the target region annotation information, a target region detection network to obtain the target region detection model.

15. The apparatus of claim 9, wherein the one or more processors are further configured to:
  obtain a plurality of defect training samples;
  extract, based on the target region detection model, a plurality of second target regions;
  obtain defect annotation information of a third target region that is in the plurality of second target regions and that comprises a second industrial defect, wherein the defect annotation information indicates a second defect type and a second location of the second industrial defect in the third target region; and
  train, based on the third target region, a defect detection network to obtain the defect detection model.

16. The apparatus of claim 9, wherein the target region detection model uses a multi-degree-of-freedom quadrilateral as a detection box, and wherein an angle between each edge of the multi-degree-of-freedom quadrilateral and each edge of the to-be-recognized image comprises is of any degree from 0 degrees to 180 degrees.

17. A computer program product comprising instructions stored on a non-transitory computer-readable medium that, when executed by one or more processors, cause an apparatus to:
  obtain a to-be-recognized image, wherein the to-be-recognized image is of an industrial product;
  extract, based on a target region detection model, at least one target region from the to-be-recognized image, wherein the at least one target region comprises a first industrial defect;
  obtain, based on the at least one target region and a defect detection model, a defect coarse-selection region and a first defect type of the first industrial defect, wherein the defect coarse-selection region is in a first target region of the at least one target region, and wherein the defect coarse-selection region comprises the first industrial defect; and
  determine a size and a first location of the first industrial defect in the defect coarse-selection region.

18. The computer program product of claim 17, wherein the one or more processors are further configured to execute the instructions to cause the apparatus to:
  use the at least one target region as an input of the defect detection model, wherein the defect detection model comprises an artificial intelligence (AI) model trained by using a defect training sample;
  perform, based on the defect detection model, inference to obtain a second location of the defect coarse-selection region in the target region and the first defect type; and
  extract, based on the second location, the defect coarse-selection region.

19. The computer program product of claim 17, wherein the one or more processors are further configured to execute the instructions to cause the apparatus to:
  determine, based on a grayscale distribution in the defect coarse-selection region, the size and the first location; and
  determine, based on the first location, a second location of the defect coarse-selection region in the first target region, and a third location of the first target region in the to-be-recognized image, a fourth location of the first industrial defect in the to-be-recognized image.

20. The computer program product of claim 19, wherein the one or more processors are further configured to execute the instructions to cause the apparatus to:
  generate a detection report, wherein the detection report comprises the first defect type, the size, and the fourth location; and
  provide, for a user, the detection report.

* * * * *

UNITED STATES PATENT AND TRADEMARK OFFICE
CERTIFICATE OF CORRECTION

PATENT NO. : 12,444,038 B2  
APPLICATION NO. : 18/316757  
DATED : October 14, 2025  
INVENTOR(S) : Xiudong Wang, Xin Jin and Dandan Tu Page 1 of 1

It is certified that error appears in the above-identified patent and that said Letters Patent is hereby corrected as shown below:

In the Claims

Claim 16, Column 27, Line 43: "comprises is of any" should read "comprises any"

Signed and Sealed this  
Second Day of December, 2025

John A. Squires  
*Director of the United States Patent and Trademark Office*